(12) United States Patent
Ennsbrunner

(10) Patent No.: US 12,203,949 B2
(45) Date of Patent: Jan. 21, 2025

(54) METHOD FOR QUALITY ASSESSMENT OF A PROCESSING OPERATION WITH ADAPTIVE QUALITY ASSESSMENT PARAMETERS ADAPTED TO CHANGES IN PROCESSING PARAMETERS

(71) Applicant: Fronius International GmbH, Pettenbach (AT)

(72) Inventor: Helmut Ennsbrunner, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 17/923,278

(22) PCT Filed: Dec. 21, 2021

(86) PCT No.: PCT/EP2021/086920
§ 371 (c)(1),
(2) Date: Nov. 4, 2022

(87) PCT Pub. No.: WO2022/136331
PCT Pub. Date: Jun. 30, 2022

(65) Prior Publication Data
US 2023/0236212 A1    Jul. 27, 2023

(30) Foreign Application Priority Data
Dec. 22, 2020    (EP) .................... 20216264

(51) Int. Cl.
*B23K 9/095*    (2006.01)
*G01N 21/95*    (2006.01)
*G01N 35/00*    (2006.01)

(52) U.S. Cl.
CPC ....... *G01N 35/00613* (2013.01); *B23K 9/095* (2013.01); *G01N 21/95* (2013.01)

(58) Field of Classification Search
CPC .. G01N 35/00613; G01N 21/95; B23K 9/025; B23K 9/0953; B23K 9/0956;
(Continued)

(56) References Cited

U.S. PATENT DOCUMENTS 6,137,860 A * 10/2000 Ellegood ............... B24B 7/06
228/104
2007/0088524 A1* 4/2007 Burvenich ........... G05B 13/021
702/130
(Continued)

FOREIGN PATENT DOCUMENTS

DE    102019200482 A1 *  7/2020
EP       1 642 366 B1      5/2019
(Continued)

OTHER PUBLICATIONS

Christian, D. DE-102019200482-A1 English translation from PE2E, Jul. 2020 (Year: 2020).*
(Continued)

*Primary Examiner* — Kamini S Shah
*Assistant Examiner* — Jonathan Michael Skrzycki
(74) *Attorney, Agent, or Firm* — Collard & Roe, P.C.

(57) ABSTRACT

In a method and device for assessing the quality of a processing operation, a workpiece with specific processing parameters is processed along a processing trajectory. The (X), wherein the processing result is measured by at least one sensor and at least one sensor signal is recorded and at least one quality parameter is determined based on at least one sensor signal and the at least one quality parameter is compared with quality parameter threshold values to assess the quality of the processing result. During the assessment of the processing operation quality, changes made to the processing parameters from target values during the processing are automatically taken into consideration, in that, instead of (Continued)

Figure 1:
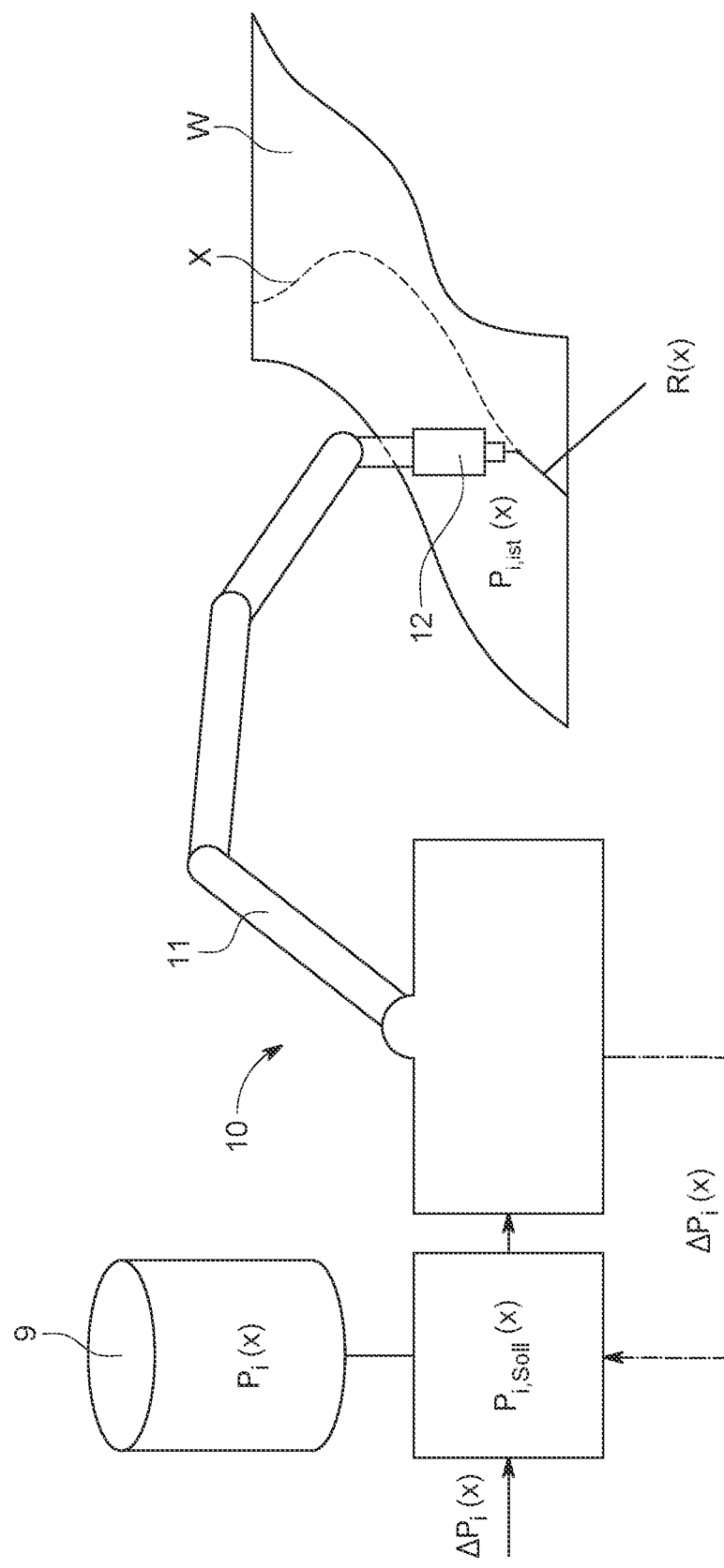

the quality parameter threshold values, quality parameter threshold values adapted to the changes in the processing parameters are determined, and the at least one quality parameter for assessing the quality of the processing result is compared with the adapted quality parameter threshold values.

16 Claims, 5 Drawing Sheets

(58) Field of Classification Search
CPC ...... B23K 31/02; B23K 31/125; B25J 9/1684; G05B 2219/37217
See application file for complete search history.

(56) References Cited

U.S. PATENT DOCUMENTS

| | | | | |
|---|---|---|---|---|
| 2009/0173726 A1* | 7/2009 | Davidson | ............. | B23K 9/0953 219/130.01 |
| 2009/0314412 A1* | 12/2009 | Gabler | ................. | B23K 31/125 228/103 |
| 2016/0001391 A1* | 1/2016 | Nacey | ................. | B23K 31/125 219/137 R |
| 2017/0151634 A1* | 6/2017 | Witney | .................. | G01N 29/04 |
| 2019/0061039 A1* | 2/2019 | Doyle | ................. | B23K 9/1043 |
| 2019/0291200 A1* | 9/2019 | Albright | ............. | B23K 9/0953 |
| 2020/0363787 A1 | 11/2020 | Schoerghuber et al. | | |
| 2021/0101220 A1* | 4/2021 | Dunahoo | ............. | B23K 9/0953 |
| 2021/0107082 A1* | 4/2021 | Monjardin | ........... | B23K 9/0953 |
| 2022/0066430 A1* | 3/2022 | Mathis | ............... | G05B 19/4188 |

FOREIGN PATENT DOCUMENTS

| | | |
|---|---|---|
| EP | 3 566 806 A1 | 11/2019 |
| JP | H03184670 A | 8/1991 |
| JP | H4-17987 A | 1/1992 |
| JP | H5-337662 A | 12/1993 |
| JP | 2005-111538 A | 4/2005 |
| JP | 3906561 B2 | 4/2007 |
| JP | 2008200740 A | 9/2008 |
| WO | 00/35622 A1 | 6/2000 |
| WO | WO-2016075518 A1 * | 5/2016 ........... B23K 31/125 |

OTHER PUBLICATIONS

International Search Report in PCT/EP2021/086920, dated Apr. 22, 2022.
European Search Report in EP 20216264.0-1202, dated May 17, 2021, with English translation of relevant parts.
Japanese Office Action in Japanese Application No. 2023-500386 dated Jan. 23, 2024 with English translation.
Japanese Office Action in Japanese Patent Application No. 2023-500386 dated Jul. 9, 2024 with English translation.

* cited by examiner

METHOD FOR QUALITY ASSESSMENT OF A PROCESSING OPERATION WITH ADAPTIVE QUALITY ASSESSMENT PARAMETERS ADAPTED TO CHANGES IN PROCESSING PARAMETERS

CROSS REFERENCE TO RELATED APPLICATIONS

This application is the National Stage of PCT/EP2021/086920 filed on Dec. 21, 2021, which claims priority under 35 U.S.C. § 119 of European Application No. 20216264.0 filed on Dec. 22, 2020, the disclosure of which is incorporated by reference. The international application under PCT article 21(2) was not published in English.

The invention relates to a method for assessing the quality of a processing operation, in which a workpiece with specific processing parameters is processed along a processing trajectory, the processing result of the processing operation being measured along the processing trajectory with at least one sensor and at least one sensor signal being recorded and at least one quality parameter being determined from at least one sensor signal, and the at least one quality parameter being compared with quality parameter threshold values for assessing the quality of the processing result of the processing operation along the processing trajectory.

Furthermore, the invention relates to a device for assessing the quality of a processing operation of a workpiece with specific processing parameters along a processing trajectory.

Processing operations include, in particular, joining processes, such as, for example, welding or soldering processes, in which workpieces are joined together or workpieces are coated, but also surface treatment processes, such as, for example, plasma processing operations, in which workpieces are processed with plasma in order to prepare them for subsequent processing operations. For example, the surface of workpieces can be treated with plasma prior to lacquering in order to remove residues from the surface and/or to improve the adhesion of the lacquer layer.

It is sufficiently known to monitor or assess the quality of a processing operation in order to be able to eliminate defective workpieces or to adapt processing parameters accordingly in order to improve the quality. To that end, processing trajectories are evaluated after the processing operation and the quality of the processing operation is assessed therefrom. In the simplest case, the quality assessment can be carried out in the form of a visual assessment by qualified personnel. Typically, however, the processing result of the processing operation along the processing trajectory is automatically measured with corresponding sensors and at least one quality parameter is determined from the sensor signals. To assess the quality, the at least one quality parameter is compared with quality parameter threshold values. For example, a weld seam as a processing trajectory of a welding process can be measured after the welding process with a camera, preferably with illumination, and from this the seam width and seam elevation of the weld seam can be determined with appropriate image processing algorithms, and a quality parameter can be derived therefrom. Depending on the processing task or welding task, different quality parameters can be used to define the quality of the weld seam. For example, in the case of a visible weld seam, in addition to the mechanical properties of the weld seam, it may also be important for the weld seam to be as narrow and regular as possible, whereas in the case of a weld seam which is not visible, it may be more important for the strength of the connection and thus for a sufficient weld penetration depth. The at least one quality parameter suitable for the respective processing operation is correspondingly defined and then compared with specific quality parameter threshold values, for example an upper and lower threshold value, in order to be able to automatically assess the quality. The quality parameters are usually determined by assessing optimally processed workpieces with IO ("in order") processing trajectories. In welding processes, for example, the size of the weld undercut, the so-called a-dimension, the seam elevation, the end crater at the end of the weld seam, etc., can be used as quality parameters.

EP 3 566 806 A1 describes a welding process as a processing operation in which optimum welding parameters, which were determined on the basis of test welds on test workpieces, are automatically used for the welding process in order to achieve specific quality criteria. The determination of the optimum welding parameters for the respective welding task takes place via the optimum value of a calculated quality function via the respective optimum welding parameters of the test welds.

EP 1 642 366 B1 and WO 00/35622 A1 describe methods for monitoring the quality of the welding process, in which information about the weld seam produced is compared with predetermined values and, in the event of a deviation, the welding parameters are correspondingly adapted or, in the event of large deviations, a warning is issued. In this case, the processing parameters are adjusted to predetermined target values.

DE 10 2019 200 482 A1 describes a processing operation in which the workpiece is processed with predetermined processing parameters and, in the event of a deviation of the processing result, the processing parameters are correspondingly adapted in order to always achieve a processing result which is as constant as possible.

A welding system with a monitoring of the welding process with the aim of constant conditions and constant quality of the processing result is known from US 2009/0173726 A1. Adapting the quality assessment to deliberately performed changes in the processing parameters during the processing of the workpiece is not discussed and is not even desirable.

In known quality assessment systems of processing operations, in particular welding processes, it is checked whether specific criteria lie within predetermined limits. For example, a weld seam produced is compared with a previously defined "ideal weld seam" and the quality of the weld seam produced is assessed therefrom. However, if processing parameters are deliberately changed manually or automatically during the processing operation, no automatic adaptation of the quality criteria takes place during the quality assessment, but must be carried out manually, which is time-consuming. This can lead to the quality of the processing operation being assessed as inadequate because the deliberately performed changes in the processing parameters during the processing operation were not automatically taken into consideration. The quality of the processing operation can also be assessed positively, although the result does not meet the quality criteria. For example, in a welding process, it may be necessary to adapt specific welding parameters due to workpiece tolerances. For example, a larger gap width occurring due to tolerances of the workpieces or clamping devices can make it necessary to adapt the wire feed and other welding parameters. If the quality assessment system is not automatically informed of the change in the target values of the welding parameters, an incorrect assessment of the quality of the weld may result.

The object of the present invention is to provide an abovementioned method and a device for assessing the quality of a processing operation, by means of which the described drawbacks with respect to a deliberately performed change in the processing parameters during the processing operation do not occur and a reproducible statement about the quality of the processing operation and of the processed workpieces is made possible. Automatic quality assessment systems should also be able to be used in the event of deliberate manually or automatically performed changes in the processing parameters and should be able to make reliable statements about the quality of the processing operation or of the processed workpiece.

The object according to the invention is achieved from the point of view of the method by virtue of the fact that, in the assessment of the quality of the processing operation, performed changes in the processing parameters are automatically taken into consideration from the target values during the processing of the workpiece along the processing trajectory, by virtue of the fact that, instead of the quality-parameter threshold values, quality-parameter threshold values adapted to the changes in the processing parameters are determined, and the at least one quality parameter for assessing the quality of the processing result of the processing operation along the processing trajectory is compared with the adapted quality-parameter threshold values. The method according to the invention thus provides for the actual values of the processing parameters to be communicated to the quality assessment system during the processing operation, as a result of which deliberately performed changes in the target values of the processing parameters are automatically taken into consideration when assessing the quality of the processing operation by adapting the quality parameter threshold values accordingly to the changes in the processing parameters. As a result, the quality of the processed workpieces can be assessed more reliably and, for example, an unjustified rejection of workpieces which are assessed as qualitatively inferior, or workpieces which are assessed as inadmissibly positive, although they do not meet the quality criteria, can be prevented. It is important that only deliberate or intentional changes in the processing parameters are taken into consideration and no changes caused by disruptions. Manually performed changes in the target values of the processing parameters or automatically performed changes in the target values of the processing parameters as a result of adaptive processing operations are regarded as intended changes. Target values of the processing parameters can be one-piece parameters, such as, for example, an average welding current to be set or an average wire feed, even if these processing parameters deviate from these set values during processing. The deliberately performed changes in the processing parameters from the target values can be transmitted as standard or only in the event of an occurrence to the location where the quality assessment is carried out. The reliability of the quality assessment can be increased by taking into consideration the changes in the processing parameters from the target values and adapting the quality parameter threshold values to the changes in the processing parameters. The effects of changed processing parameters on the quality parameters can vary significantly depending on the type of processing. The relationship between changes in the processing parameters and changes in the quality parameters for assessing the quality of the processing operation or of the processing result can be determined on the basis of test processing operations and stored in tables or functional relationships. Due to the automatic consideration during the quality assessment, it is possible that quality assessment systems can be used even with changed processing parameters due to usual tolerances of the workpieces and provide reliable results.

The performed changes in the processing parameters can be determined from the target values during the processing of the workpiece along the processing trajectory by comparing transmitted actual values of the processing parameters and transmitted target values of the processing parameters. In this case, the target values designate those before the performed changes, and the actual values designate those after the performed changes. In this so-called "online method", the changes in the processing parameters are determined and transmitted virtually in real time, so that the quality monitoring of the processing operation along the processing trajectory can be carried out at any time with the real data. The changes in the processing parameters also include system-related changes which can occur, for example, when replacing parts subject to wear of the processing device. For example, the welding voltage will be reduced after the replacement of a contact tube of a welding torch. If, when assessing the quality of the processing operation, these intended changes in the processing parameters and the associated changed quality parameter threshold values are also taken into consideration, a more reliable statement about the quality of the processing operation or of the workpiece processed during the processing operation results.

Alternatively or additionally, the performed changes in the processing parameters from the target values and/or transmitted actual values of the processing parameters and/or transmitted target values of the processing parameters can also be recorded during the processing of the workpiece along the processing trajectory and can later be used for automatic consideration in the assessment of the quality of the processing operation along the processing trajectory. In this so-called "offline method", the changes in the processing parameters and the associated threshold values of the quality parameters are recorded and stored for later use, so that they can be used in carrying out the quality monitoring of the processing operation.

According to a further feature of the invention, the quality parameter threshold values adapted to the changes in the processing parameters are determined from stored quality parameter threshold values for specific processing parameters. If threshold values for the resulting quality parameters, by means of which the processing result can be assessed, are stored for the most varied processing situations and the most varied processing parameters, the quality parameter threshold values can be determined from these stored values as a function of the respective real processing parameters. Upper and lower quality parameter threshold values can be defined as quality parameter threshold values, or a quality parameter mean value with a specific maximum quality parameter fluctuation range can also be defined. The stored quality parameter threshold values can be stored in the same memory or in the same database as the processing parameters or in other memories or databases.

The stored quality parameter threshold values can be determined, for example, from test processing operations or processing tests, for example test welding processes or welding tests, for specific processing parameters and specific faults.

The quality parameter threshold values adapted to the changes in the processing parameters are preferably determined by interpolation of the stored quality parameter threshold values for specific processing parameters. By means of such interpolation methods, the respective quality parameter threshold values can be determined quickly and without great computational effort for most varied processing parameters.

Preferably, when determining at least one quality parameter from at least one sensor signal for measuring the processing result, the change in at least one processing parameter is taken into consideration. For example, when determining the seam width of a weld seam as the quality parameter of a welding process, a change in the feed rate of the welding wire, which has a significant influence on the seam width, can be taken into consideration.

When assessing the quality of the processing operation, additional environmental parameters, such as, for example, a workpiece temperature, an ambient temperature, air humidity, or the like, can be taken into consideration. By including such environmental parameters, which may also be dependent on the processing trajectory, the result of the quality assessment is further improved.

The processing result along the processing trajectory can be measured with the aid of the workpiece non-destructive measuring methods, for example with optical sensors as the at least one sensor, in particular laser scanners, cameras or the like, X-ray sensors, and/or temperature sensors, and at least one sensor signal can be recorded. A recording of the processing result with the aid of non-destructive measuring methods and preferably contactless sensors has the advantage that the measurement of the processing result can be carried out particularly quickly and along the entire processing trajectory and the processed workpiece is not changed in the process. In the case of specific influencing factors, it may be advantageous to carry out the measurement of the processing result along the processing trajectory immediately after the processing of the workpiece. For example, the temperature profile in the material of the workpiece can provide information about the material structure of the processing result within and around the processing trajectory immediately after the processing has been carried out. With specific quality parameters, it can also be advantageous to measure the processing result along the processing trajectory only sometime after the processing of the workpiece, since the quality of the processing operation can only be assessed after this time.

Alternatively or additionally, the processing result along the processing trajectory can also be measured with the aid of the workpiece destructive measuring methods which destroy the workpiece, for example by making cuts through the workpiece at various points of the processing result along the processing trajectory and, in particular, by making images of the surface of the cuts using the at least one sensor, and at least one sensor signal can be recorded. For example, microsections can be made at specific intervals of the processing result along the processing trajectory and specific quality parameters can be derived therefrom. Such measuring methods, which are naturally more complex, also provide essential insights into the internal structure of the processing result along the processing trajectory, which could not be detected with non-contacting measuring methods, or could only be detected "poorly". The recorded microsections of the processing result along the processing trajectory can in turn be analysed with various methods, in particular with the aid of cameras and associated image processing methods. The use of specific chemicals can improve the recognition of the microstructure of the microsections of the processing results. A macroscopic examination of microsections after the processing operation can also provide characteristic quality parameters. The microsections are analysed and determined and stored in the form of specific sensor signals and subsequently characterising quality parameters of the processing result along the processing trajectory. In addition to the production of microsections, tensile tests, bending tests, etc. on the workpieces are also conceivable.

According to a further feature of the invention, the processing result along the processing trajectory is measured during the processing of the workpiece with the at least one sensor, the speed of the measurement of the processing trajectory preferably corresponding to the processing speed. In this embodiment variant, the assessment of the quality of the processing operation or the measurement of the processing trajectory of the workpiece takes place directly or a relatively short period of time after the processing of the workpiece. In this case, it is advantageous if the quality assessment system is moved synchronously with the processing system with respect to the workpiece. For example, a camera measuring the processing trajectory can be mounted on the same robot arm, which also carries the processing tool, and the processing trajectory can be analysed following the processing of the workpiece. In this case, the measurement of the processing result along the processing trajectory takes place at the same speed as the processing of the workpiece. Of course, the quality-assessment system and processing system can also be stationary and the workpiece can move during the processing or both the quality-assessment system and processing system and the workpiece can be moved against one another.

The processing result along the processing trajectory can also be measured after completion of the processing of the workpiece with the at least one sensor, the speed of the measurement of the processing result along the processing trajectory preferably being greater than the processing speed of the processing operation. If the measurement of the processing result along the processing trajectory takes place independently of the processing of the workpiece, the speed of the measurement can also be selected to be substantially higher than the processing speed. For example, the optical scanning of the processing result along the processing trajectory after the processing of a workpiece can take place much faster than the processing of the workpiece itself. Moreover, several runs of measurements of the processing result along the processing trajectory can also be carried out with different sensors, and the quality parameters can then be determined from the different sensor signals. Furthermore, the workpieces of a plurality of processing stations can thus be assessed with a single measuring station.

If at least one quality parameter is exceeded above a quality parameter threshold value or an adapted quality parameter threshold value, a warning can be output and/or the excess can be stored. The warning can take place, for example, acoustically, optically or else in mechanical form via a vibration mechanism. In this way, it is possible to point out correspondingly that quality parameters have been exceeded. The warning can also be forwarded to higher-level locations via corresponding communication channels.

The warning can be changed as a function of the degree to which at least one quality parameter is exceeded via a quality parameter threshold value or an adapted quality parameter threshold value.

For example, the volume of an acoustic warning or the luminous intensity or flashing frequency of an optical warning can be adapted to the magnitude of the quality deviation and the staff can be informed of the magnitude of the quality deviation by means of the warning.

In the case of a welding seam as a processing trajectory, the processing parameters of the welding process: welding current, welding voltage, conveying speed of a welding wire, angle of incidence of a welding torch with respect to the workpiece, relative position of a welding torch with respect to the workpiece and/or the welding speed, are preferably taken into consideration. Such a welding process also includes a soldering process in which, in contrast to welding, no or less melting of the base material of the workpiece takes place.

The object according to the invention is likewise achieved by an abovementioned device for assessing the quality of a processing operation, which device is set up for carrying out the abovementioned method. Reference is made to the above description of the method with regard to the advantages which can be achieved thereby. The device for quality assessment is characterised by a corresponding connection to the processing device, by means of which the performed changes in the processing parameters during the processing of the device for quality monitoring are communicated, so that the threshold values of the quality parameters can be adapted automatically to the changes in the processing parameters.

Figure 3:
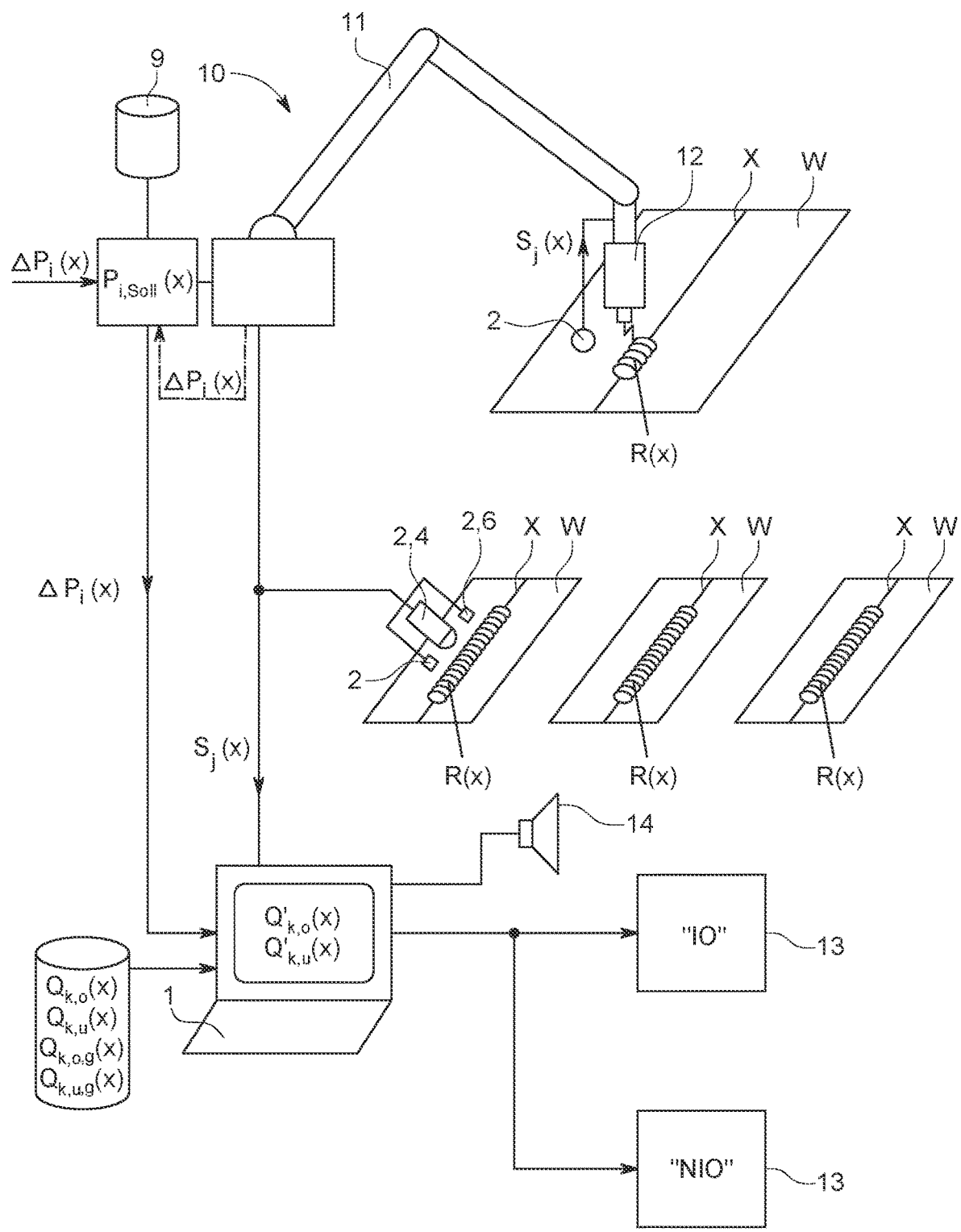
Figure 4:
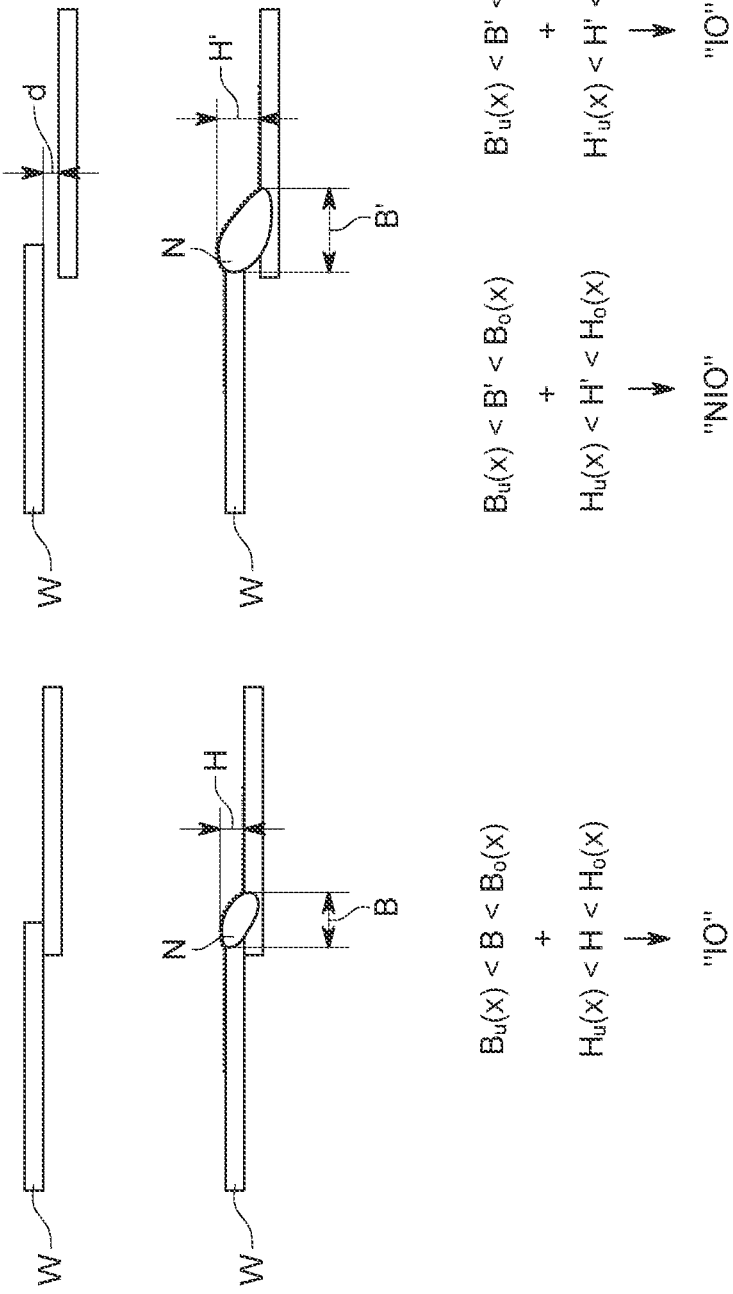

The present invention is further explained with reference to the appended drawings. In the drawings:

FIG. 1 shows a schematic processing operation in which a workpiece having specific processing parameters is processed along a processing trajectory;

FIGS. 2A to 2D schematically outline a method for assessing the quality of a processing operation with various sensors for measuring the processing result along the processing trajectory;

FIG. 3 shows a schematic representation of the method according to the invention for assessing the quality of a processing operation on a workpiece; and FIG. 4 is an example of a deliberate change in the processing parameters during a processing operation and its consideration in the quality assessment of the processing operation.

FIG. 1 shows a schematic processing operation in which a workpiece W having specific processing parameters $P_i(x)$ is machined along a processing trajectory X to form a processing result $R(x)$. The processing device 10 contains a processing robot 11, which carries the respective processing head 12, with which the workpiece W is processed, and leads along the processing trajectory X to the formation of the processing result $R(x)$. For processing the workpiece W, specific target values of the processing parameters $P_{i,soll}(x)$ are selected from a plurality of possible processing parameters $P_i(x)$, which are stored, for example, in a database or a memory 9, with which the workpiece W is processed in order to achieve a desired processing result. A manual intervention on the processing device 10 or also an automatic machine intervention in adaptive processing operations (symbolized by the dash-dotted line) can result in changes in the target values of the processing parameters $P_{i,soll}(x)$ and thus in desired or necessary changes in the processing parameters $\Delta P_i(x)$ during the processing operation. In the case of subsequent quality monitoring of the processing result $R(x)$ of the processing operation by appropriate inspection of the processed workpiece W along the processing trajectory X, such changes in the processing parameters $\Delta P_i(x)$ are usually not automatically taken into consideration from the target values of the processing parameters $P_{i,soll}(x)$ in known methods, as a result of which incorrect assessments of the quality of the workpieces W can occur. Due to the fact that conventional quality control systems fail when the processing parameters $\Delta P_i(x)$ are deliberately changed, because the changed processing result R'(x) does not correspond to the expected processing result $R(x)$, it is usually necessary to perform a complicated manual check of the workpieces W machined with the deliberately changed processing parameters $\Delta P_i(x)$.

The processing device 10 may be, for example, a welding device for carrying out a joining process on a workpiece W. In this case, a welding torch is fastened to a welding robot, by means of which two or more workpieces W can be joined to one another or a layer can be applied to a workpiece W. The processing result $R(x)$ in this case is a weld seam between two or more workpieces W to be joined or a weld bead on the surface of a workpiece W. Furthermore, the processing device 10 can also be formed by a device for treating the surface of a workpiece W with a plasma torch, a painting device and much more. Depending on the processing operation, the processing result $R(x)$ along the processing trajectory X and also the assessment of the quality of the processing operation and of the respective processing result $R(x)$ along the processing trajectory X differ.

FIGS. 2A to 2D schematically show a method for assessing the quality of a processing operation with various sensors 2 for measuring the respective processing result $R(x)$ of the processing operation along the processing trajectory X on the basis of a welding process as a processing operation.

Figure 2A:
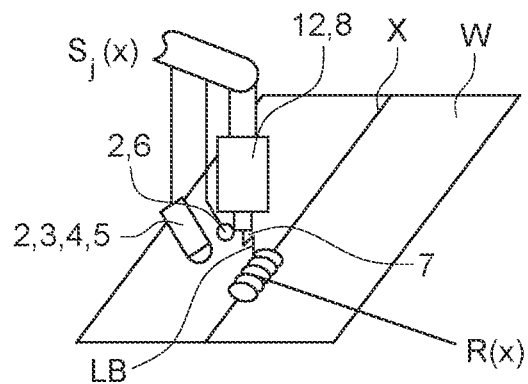

FIG. 2A shows a quality assessment of the processing operation which takes place during or immediately after the processing of the workpiece W (so-called "online" quality assessment). Accordingly, the sensors 2 for measuring the processing result $R(x)$ of the processing operation are arranged along the processing trajectory X of the workpiece W at or behind the processing head 12, so that the processing result $R(x)$ can be measured along the processing trajectory X immediately after the processing operation. The processing head 12 may be, for example, a welding torch 8, via which a consumable welding wire 7 is fed to the workpiece W for carrying out a joining process or build-up welding process. Between the end of the welding wire 7 and the workpiece W, an arc LB burns, which melts the welding wire 7 and the workpiece W. Possible sensors 2 for measuring the processing result $R(x)$ along the processing trajectory X of the workpiece W are, for example, optical sensors 3, cameras 4, X-ray sensors 5 or temperature sensors 6, which measure the processing result $R(x)$ along the processing trajectory X and provide corresponding sensor signals $S_j(x)$ as a function of the point along the processing trajectory X. In the "online" quality assessment, the speed of the measurement of the processing result along the processing trajectory X with the sensors 2 preferably corresponds to the speed of the processing operation, that is to say the processing speed, for example the welding speed $v_s(x)$ in a welding process.

Figure 2B:
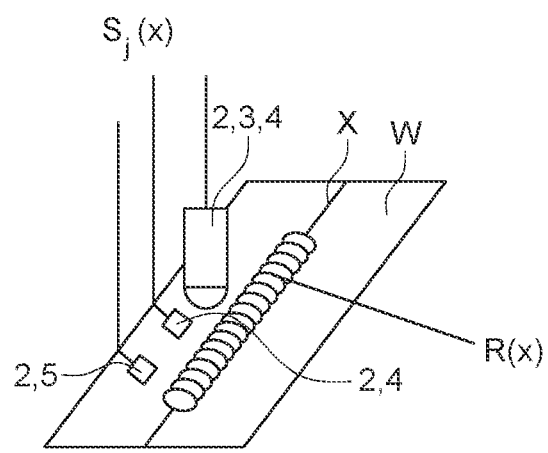

As an alternative or in addition to the "online" quality assessment, according to FIG. 2B, an "offline" quality assessment can also take place, in which the workpiece W or the processing result $R(x)$ is measured along the processing trajectory X after the processing operation has taken place with corresponding sensors 2, for example optical sensors 3, cameras 4, or X-ray sensors 5 or the like, and corresponding sensor signals $S_j(x)$ are provided. In the case of the "offline" quality assessment, the speed of the measurement of the processing result $R(x)$ along the processing trajectory X with the sensors 2 after completion of the processing of the workpiece W can be higher than the processing speed. Nevertheless, in contrast to the "online" quality assessment, the "offline" quality assessment represents additional time expenditure.

Figure 2C:
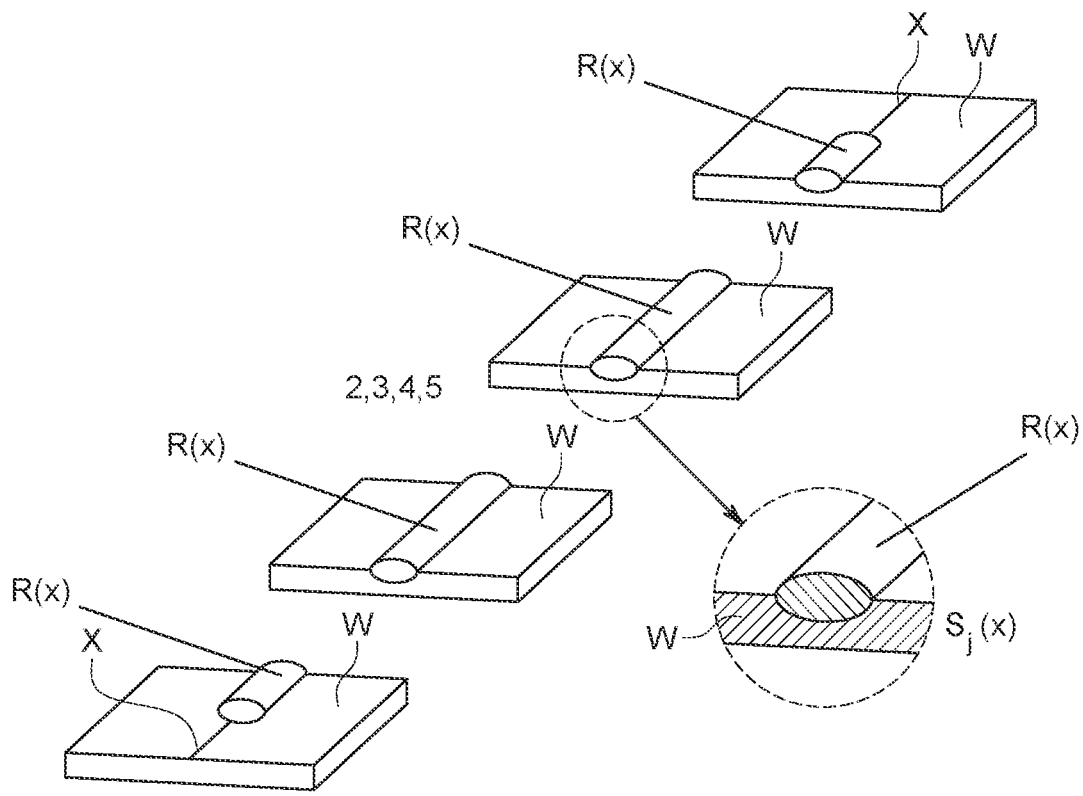

In FIG. 2C, a method of quality assessment of the processing operation is outlined, in which the workpiece W is destroyed along the processing trajectory X for the analysis of the processing result R(x), in that microsections of the workpiece W are produced in the region of the processing result R(x) at a plurality of points of the processing result R(x) along the processing trajectory X. These microsections can be measured with corresponding sensors 2 and image-processing methods and provide sensor signals $S_j(x)$, which likewise provide information about the quality of the processing operation on the workpiece W and of the processing result R(x) at specific points along the processing trajectory X. For example, during a welding process, such a microsection can provide indications of the weld penetration depth of the weld seam as the processing result R(x).

Figure 2D:
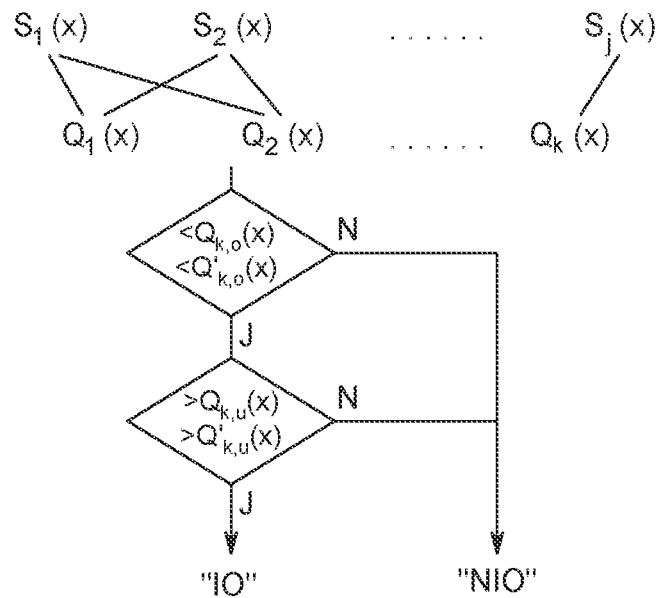

As illustrated in FIG. 2D, quality parameters $Q_k(x)$, which characterise the quality of the processing result R(x) of the processing operation for the respective processing task, are determined from the various sensor signals $S_j(x)$ of the processing result R(x). Depending on the processing task, different quality parameters $Q_k(x)$, which quantify the quality of the processing result R(x) along the processing trajectory X, can exist. In order to assess the quality, the at least one quality parameter $Q_k(x)$ is now compared with quality parameter threshold values, for example an upper quality parameter threshold value $Q_{k,o}(x)$ and a lower quality parameter threshold value $Q_{k,u}(x)$. If the quality parameter threshold values $Q_{k,o}(x)$, $Q_{k,u}(x)$ are exceeded, the quality is assumed not to be fulfilled, which is marked with "NIO" (not in order). If all quality parameters $Q_k(x)$ are within their quality parameter threshold values $Q_{k,o}(x)$, $Q_{k,u}(x)$, the quality of the processing operation is considered to be fulfilled and the workpiece W is classified as "IO" (in order). If there are deliberately manual or automatically performed changes in the processing parameters $\Delta P_i(x)$ during the processing operation, the processing result R'(x) consequently changes. If this changed processing result R'(x) is now measured with the sensors 2 and quality parameters $Q'_k(x)$ are determined therefrom and compared with the original quality parameter threshold values $Q_{k,o}(x)$, $Q_{k,u}(x)$, then generally false quality statements result. Therefore, the object of the present invention is to automatically take into consideration the deliberately performed changes in the processing parameters $\Delta P_i(x)$ during the processing operation in the assessment of the quality of the processing operation and of the changed processing result R'(x). This will preferably result in adapted and changed quality parameter threshold values $Q'_{k,o}(x)$, $Q'_{k,u}(x)$.

FIG. 3 shows a schematic representation of the method according to the invention for assessing the quality of a processing operation and of the processing result R(x) along the processing trajectory X on a workpiece W. The device 1 for quality assessment of the processing operation receives the various sensor signals $S_j(x)$ which measure the processing result R(x) along the processing trajectory X during the processing operation by sensors 2 mounted on the processing head 12 of the processing device 10 ("online" quality assessment). Alternatively or additionally, the sensor signals $S_j(x)$, which were recorded after the processing operation by measuring the processing results R(x) along the processing trajectories X with corresponding sensors 2, are provided to the device 1 for quality assessment. At least one quality parameter $Q_k(x)$ is determined from the at least one sensor signal $S_j(x)$ and the at least one quality parameter $Q_k(x)$ is compared with quality parameter threshold values $Q_{k,o}(x)$, $Q_{k,u}(x)$ for assessing the quality of the processing operation and the processing result R(x) along the processing trajectory X. If the quality parameter threshold values $Q_{k,o}(x)$, $Q_{k,u}(x)$ are exceeded, the quality is assumed not to be fulfilled and the workpiece is classified as "NIO" (not in order), which is indicated on a display 13, for example. If all quality parameters $Q_k(x)$ are within their quality parameter threshold values $Q_{k,o}(x)$, $Q_{k,u}(x)$, the quality of the processing operation and of the processing result R(x) is considered to be fulfilled and the workpiece W is classified as "IO" (in order), which is indicated on the display 13, for example. In addition, if a quality parameter threshold value $Q_{k,o}(x)$, $Q_{k,u}(x)$ is exceeded, a warning can also be output, for example an acoustic warning on a loudspeaker 14.

According to the invention, when assessing the quality of the processing operation and the processing result R(x) along the processing trajectory X, performed changes in the processing parameters $\Delta P_i(x)$ are automatically taken into consideration from the target values of the processing parameters $P_{i,soll}(x)$ during the processing of the processing trajectory X of the workpiece W, which is illustrated by the connection of the processing device 10 to the device 1 for assessing the quality of the processing operation. This can take place, for example, in that, on the basis of the changed situation, also adapted quality parameter threshold values $Q'_{k,o}(x)$, $Q'_{k,u}(x)$ are defined, which are stored for the changes in the processing parameters $\Delta P_i(x)$ or are defined by corresponding calculation rules. The automatic assessment of the quality of the processing operation and of the changed processing result R'(x) is thus automatically based on the adapted quality parameter threshold values $Q'_{k,o}(x)$, $Q'_{k,u}(x)$, as a result of which the reliability of the quality monitoring can be increased. Furthermore, this makes the quality assessment suitable for adaptive processing systems. As a result, even workpieces W which, on the basis of customarily occurring tolerances, can be machined with changed processing parameters in accordance with the changes in the processing parameters $\Delta P_i(x)$ and can provide other processing results R'(x) as ideal workpieces W, can be found to be "IO" (in order) by the quality-assessment system, without the need for a complex manual check. The adapted quality parameter threshold values $Q'_{k,o}(x)$, $Q'_{k,u}(x)$ can be defined from stored quality parameter threshold values $Q_{k,o,g}(x)$, $Q_{k,u,g}(x)$, which are determined from test processing operations for specific processing parameters $P_i(x)$, for example by interpolation of the stored quality parameter threshold values $Q_{k,o,g}(x)$, $Q_{k,u,g}(x)$.

FIG. 4 shows an example of a deliberate change in the processing parameters $\Delta P_i(x)$ during a processing operation and its consideration in the quality assessment of the processing operation using a welding process. In the left-hand part of the figure, a workpiece W is shown in sectional view at the top before the processing and below it after the processing or after the welding process. This involves the passage of an overlap weld seam on two overlappingly arranged workpieces W. The workpieces W usually rest on top of one another without a gap and the welding process is carried out with pre-set welding parameters. In quality monitoring, for example, the width B(x) and the height H(x) of the weld seam N are determined as quality parameters along the processing trajectory X and are compared with threshold values for the width $B_o(x)$, $B_u(x)$ and height $H_o(x)$, $H_u(x)$ of the weld seam N. If the conditions $B_u(x)<B<B_o(x)$ and $H_u(x)<H<H_o(x)$ are met, the quality of the processing operation is assessed positively and the workpiece is classified as "IO".

In practice, tolerances usually occur, which can lead, for example, to a gap d between the workpieces W, as shown in the right-hand part in FIG. 4. During the welding process, these changed conditions are acted upon, for example, manually or automatically (in an adaptive welding process), in that, for example, the conveying speed $v_d(x)$ of the welding wire and the welding current $I(x)$ are increased and the welding speed $v_s(x)$ is reduced. This results in a weld seam N having a greater width B' and a greater height H' than in the processing of the workpiece W without a gap d (left-hand part in FIG. 4). If the quality assessment is carried out without automatic consideration of the changed conditions and the deliberately performed changes in the processing parameters, the width B' and height H' of the weld seam N would be considered as inadmissible and the quality of the processing operation would be assessed negatively and the workpiece would, for example, be marked as rejected ("NIO": not in order) or sent for manual checking or post-processing.

In the method according to the invention for quality assessment, the performed changes in the processing parameters $\Delta P_i(x)$ are now taken into consideration in that the deliberately performed changes in the processing parameters $\Delta P_i(x)$ (here, for example, the increases in the conveying speed $v_d(x)$ and the welding current $I(x)$ and the reduction in the welding speed $v_s(x)$) are made known to the quality assessment and are taken into consideration in the assessment of the quality. For example, threshold values of the quality parameters $Q'_{k,o}(x)$, $Q'_{k,u}(x)$ adapted on the basis of the changes in the processing parameters $\Delta P_i(x)$ are defined for the assessment of the quality of the processing operation. In the example shown, the upper and lower threshold values for the width $B'_o(x)$, $B'_u(x)$ of the weld seam N and the upper and lower threshold values for the height $H'_o(x)$, $H'_u(x)$ of the weld seam N would be adapted to the changed welding parameters. As a result, the changed processing result $R'(x)$ or the changed weld seam N' in the right-hand part in FIG. 4 is also correctly assessed positively with regard to quality, since the conditions $B'_u(x)<B'<B'_o(x)$ and $H'_u(x)<H'<H'_o(x)$ are fulfilled. Due to the automatic consideration of the deliberately performed changes in the processing parameters $\Delta P_i(x)$ in the quality monitoring, the workpiece W can thus also be correctly classified as "IO" in this case and a manual checking of the workpiece W can be omitted.

The adapted hold values of the quality parameters $Q'_{k,o}(x)$, $Q'_{k,u}(x)$ in the event of changes in the processing parameters $\Delta P_i(x)$ can be filed and stored in Tables or according to specific rules like the original threshold values of the quality parameters $Q_{k,o}(x)$, $Q_{k,u}(x)$ for the normal processing parameters $P_i(x)$. Processing parameters $P_i(x)$ lying between the stored values and threshold values of the quality parameters $Q_{k,o}(x)$, $Q_{k,u}(x)$ can be determined by interpolation methods. The quality assessment system has access to this data, irrespective of where they are available or stored. Instead of an upper and lower threshold values of the quality parameters $Q_{k,o}(x)$, $Q_{k,u}(x)$, a quality parameter mean value $Q_{k,m}(x)$ and a maximum quality parameter fluctuation range $\Delta Q_k$ around this mean value can also be used to assess the quality of the processing result $R(x)$.

The invention claimed is:

1. A method for assessing a quality of a processing operation, the method comprising the steps of:
    processing a workpiece along a processing trajectory with specific processing parameters having target values;
    measuring a processing result of the processing operation along the processing trajectory with at least one sensor;
    recording at least one sensor signal from the at least one sensor;
    determining at least one quality parameter on the basis of the at least one sensor signal;
    automatically taking deliberate manually or automatically changed processing parameters during the processing operation along the processing trajectory into consideration, which changed processing parameters have values which deviate from the target values of the specific processing parameters, by determining adapted quality parameter threshold values adapted to the changed processing parameters; and
    assessing a quality of the processing result of the processing operation along the processing trajectory by comparing the at least one quality parameter with the adapted quality parameter threshold values,
    wherein the processing trajectory is a weld seam and the processing parameters of a welding process taken into consideration are selected from the group consisting of a welding current, a welding voltage, a conveying speed of a welding wire, a setting angle of a welding torch with respect to the workpiece, a relative position of a welding torch with respect to the workpiece and a welding speed.

2. The method according to claim 1, wherein the changed processing parameters having values which deviate from the target values of the specific processing parameters are determined during the processing of the workpiece along the processing trajectory by comparing transmitted actual values of the specific processing parameters and transmitted target values of the specific processing parameters.

3. The method according to claim 1 wherein the changed processing parameters having values which deviate from the target values of the specific processing parameters and/or transmitted actual values of the specific processing parameters and/or transmitted target values of the specific processing parameters are recorded during the processing of the workpiece along the processing trajectory and are subsequently used for automatic consideration in assessing the quality of the processing result of the processing operation along the processing trajectory.

4. The method according to claim 1, wherein the adapted quality parameter threshold values are determined from stored quality parameter threshold values for the specific processing parameters.

5. The method according to claim 4, wherein the stored quality parameter threshold values are determined from test processing operations for the specific processing parameters.

6. The method according to claim 4, wherein the adapted quality parameter threshold values are determined by interpolation of the stored quality parameter threshold values for the specific processing parameters.

7. The method according to claim 1, wherein when determining the at least one quality parameter from the at least one sensor signal at least one changed processing parameter of the changed processing parameters is taken into consideration.

8. The method according to claim 1, wherein additional environmental parameters are taken into consideration in the assessment of the quality of the processing operation.

9. The method according to claim 8, wherein the additional environmental parameters are selected from the group consisting of a workpiece temperature, an ambient temperature and an air humidity.

10. The method according to claim 1, wherein the processing result along the processing trajectory is measured using non-destructive measuring methods.

11. The method according to claim 10, wherein the non-destructive measuring methods are selected from the group consisting of optical sensors, laser scanners, cameras, X-ray sensors and temperature sensors.

12. The method according to claim 1, wherein the processing result along the processing trajectory is measured using measurement methods which destroy the workpiece.

13. The method according to claim 12, wherein the measurement methods which destroy the workpiece comprises making cuts through the workpiece at various points along the processing trajectory and making images of the surface of the cuts.

14. The method according to claim 1, wherein the processing result is measured along the processing trajectory during the processing of the workpiece with the at least one sensor, and a speed of a measurement of the processing trajectory corresponds to a processing speed.

15. The method according to claim 1, wherein the processing result is measured along the processing trajectory after completion of the processing of the workpiece with the at least one sensor, and a speed of a measurement of the processing trajectory is greater than a processing speed.

16. The method according to claim 1, wherein if at least one quality parameter exceeds a quality parameter threshold value or an adapted quality parameter threshold value of the adapted quality parameter threshold values, a warning is output and/or an excess is stored.

* * * * *